Jan. 8, 1935.  H. W. BODENDIECK  1,987,584
OPERATING MEMBER OR STICK FOR HOT LINE EQUIPMENT
Filed July 18, 1931   4 Sheets-Sheet 1

Jan. 8, 1935.  H. W. BODENDIECK  1,987,584

OPERATING MEMBER OR STICK FOR HOT LINE EQUIPMENT

Filed July 18, 1931  4 Sheets—Sheet 2

Inventor
H. W. Bodendieck
By Watson E. Coleman
Attorney

Jan. 8, 1935.  H. W. BODENDIECK  1,987,584

OPERATING MEMBER OR STICK FOR HOT LINE EQUIPMENT

Filed July 18, 1931  4 Sheets-Sheet 4

Inventor
H. W. Bodendieck
By Watson E. Coleman
Attorney

Patented Jan. 8, 1935

1,987,584

UNITED STATES PATENT OFFICE 1,987,584

OPERATING MEMBER OR STICK FOR HOT LINE EQUIPMENT

Henry W. Bodendieck, Taylorville, Ill., assignor to Tips Tool Company, Inc., Taylorville, Ill., a corporation of Illinois Application July 18, 1931, Serial No. 551,813

33 Claims. (Cl. 81—3)

This invention relates to an operating member or stick for hot line equipment and has relation more particularly to a device of this kind especially designed and adapted for use in connection with line connectors and clamps.

It is an object of the invention to provide a member or stick of this character which may be engaged with the required equipment in a manner to facilitate the placement of such equipment in desired working position without danger to the lineman or other operator.

Another object of the invention is to provide a device of this kind which is especially adapted for use in connection with a line connector or clamp comprising two relatively movable members and wherein the device or stick is provided with means for connection with one of the members to effect the desired relative movement of the members of the connector or clamp.

An additional object of the invention is to provide a member or stick of this kind having means for effectively holding a connector or clamp to facilitate the application of such connector or clamp upon a line wire, together with means for initially holding to the connector or clamp a bypass or other wire to be connected or clamped to the line wire.

The invention consists in the details of construction and in the combination and arrangement of the several parts of my improved operating member or stick for hot line equipment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

In the embodiment of my invention as illustrated in Figures 1 to 8 inclusive, H denotes an elongated handle member of wood or other material non-conductive of electricity, said handle member H in practice being of a length to readily permit a lineman to use the device from the ground or at other positions remote from the line wire and more particularly out of the danger zone surrounding such line wire.

Fixed to one end portion of the handle member H and projecting therebeyond is a socket member S, the outer end portion of which being provided with a restricted entrance opening 1 through which an elongated rod 2 passes. The extremity of the rod 2 within the socket member S carries an enlarged head 3, herein disclosed as of a hexagon type, and which head when applied adjacent to the outer end of the socket member S coacts with the angularly related internal facets 4 whereby the rod 2 may be caused to rotate with the handle member H. When the head 3, however, is positioned in the opposite end portion of the socket member S outwardly of the handle member H the rod 2 and handle member H are free to have independent rotation. The rod 2 inwardly of and immediately adjacent to the head 3 is reduced to provide a neck 5 of a diameter less than the restricted opening 1 so that in practice the rod 2 and handle member H may be permitted to have angular or lateral relative movement to facilitate the use of my improved member or hot stick.

The outer end portion of the socket member S is provided with the outwardly and diametrically opposed eye members 6.

The outer end portion of the rod 2 is continued by a reduced extension 7 angular in cross section and which is snugly received within the bore of the reduced collar member 8 carried by a socket member 9. The collar 8 and the extension 7 are pinned, as at 9', or otherwise fixedly connected one to the other. The collar 8 as well as the socket member 9 are circular in cross section. The socket member 9 is snugly and rotatably received within the portion 10 of the bore of the tubular body member B, the peripheral portion of said socket member 9 having contact with an inwardly disposed shoulder 11 afforded by the reduced portion 12 of the bore of the body member B and in which reduced portion 12 is snugly received the collar 8 of the socket member 9. Contact of the socket member 9 with the shoulder 11 holds the rod 2 against movement in one direction independently of the body member B. To hold the rod 2 against endwise movement in the opposite direction independently of the body member B the socket member 9 is provided therearound in its periphery with the groove or channel 14 in which is received a lug or nose 15 carried by an arm 16.

The arm 16 is snugly engaged between two outstanding knuckles 17 carried by the outer portion of the body member B and through said knuckles 17 and the interposed end portion of the arm 16 is a holding bolt 18. This arm 16 is also snugly received within an open notch or recess 19 formed in the outer portion of the body member B, the inner wall 20 of said notch or recess 19 being upwardly and inwardly inclined and the adjacent end of the arm 16 being similarly formed so that when the arm 16 is in applied or working position it is effectively held against outward swinging movement upon the bolt 18.

The outer end portion of the body member B is provided with a pair of diametrically opposed plates 21, the outer portions of which having their opposed faces grooved, as at 22, the inner ends of said grooves opening into the slots 23 provided in the lower portions of said plates 21 and which slots are continued as grooves 24 in the periphery of the adjacent end portion of the body member B, the inner extremities of the grooves 24 communicating with the bore of the body member B through the openings 25. The grooves 24 are adapted to receive the elongated arms 26, the outer end portions of which having heads 27 adapted to be received within the slots 23, each of said heads 27 having a slot 28 disposed in a direction lengthwise of the adjacent arm 26. The inner portion of each of the arms 26 has an inwardly offset part 29 extending within the body member B through an opening 25, said offset portion within the bore of the body member B being continued by an inwardly directed extended part 30 adapted to have contact with the wall of the bore.

Threading upon the lower or inner portion of the body member B is a sleeve 31 and as this sleeve 31 moves outwardly of the body member B it contacts with the arms 26 to maintain the same within the grooves 25 and the heads 27 within the slots 23. Upon movement of the sleeve 31 along the body member B in the opposite direction, as the outer end of the sleeve 31 reaches a point closely adjacent to the offset portions 29 of the arms 26, said arms 26 or more particularly the heads 27 thereof will drop or swing by gravity from within the slots 23. This outward swinging movement of the arms 26 and their heads 27 is facilitated by providing the outer faces of the arms 26 at their offset portions 29 with the inwardly and outwardly inclined notches 32.

The inner portion of the sleeve 31 at substantially diametrically opposed points is provided with the inwardly directed arms 33 provided at their outer extremities with the cross heads 34. With the socket member S in close proximity to the inner end of the body member B turning movement of the handle member H will result in an end portion of each of the cross heads 34 being engaged through an eye member 6 so that the operator may readily rotate the sleeve 31 in either direction desired in unison with the corresponding rotation of the handle member H. When the eye members 6 are engaged with the cross heads 34 the head 3 of the rod 2 is positioned within the inner portion of the socket member S so that during the operation of engaging the eye members 6 with the cross heads 34 there will be no resultant rotation of the rod 2.

In Figures 1, 2, 5 and 6 my improved member or stick is shown engaged with a wire connector C comprising two jaws 35 and 36, the jaw 36 having freely disposed therethrough a shank 37. The shank 37 is threaded through the jaw 35 and said shank 37 outwardly of the jaw 36 is provided with a head 38 adapted to be snugly received within the socket member 9 so that upon rotation of the rod 2 the jaws 36 and 35 may be moved one toward the other or one away from the other as required.

The connector C, as herein disclosed, is of a type whereby a jumper wire, a ground wire or the like is to be placed in electrical communication or connection with a conductor line and more particularly with a hot line. It is, therefore, important that the jumper wire or the like have an end portion initially held to the connector C to facilitate the desired application of the connector and the jumper wire or the like to the conductor wire or hot line.

As illustrated in Figures 1, 2, 3 and 5, the opposite end portions of the bolt 18 each provide a mounting for an intermediate portion of a rock arm 39, the outer extremity of which being formed to provide a jaw 40 for contact with a jumper line 41 or the like to initially hold the same to the connector C between the jaws 35 and 36 thereof. Interposed between the inner extremities of the arms 39 is a roller 42, the opposite ends of said roller being provided with integral trunnions 43, each of which being freely received within an opening 44 in the end portion of an arm 39 so that said roller while connecting the arms 39 for unitary swinging movement will allow each of the arms 39 to have a limited independent swinging or rocking movement in order to assure the most effective gripping action of both of the arms 39 upon the wire 41.

The jaw 36 which is freely engaged with the shank 37 carries adjacent its inner end the oppositely directed outstanding tapered lugs or fingers 45 which are adapted to be received within the slots 28 of the arms 26 to hold the connector C in desired engagement with the body member B and which engagement is maintained by rotating the sleeve 31 in a direction to maintain the heads 27 in their positions within the slots 23. As the sleeve 31 is rotated in a direction for engagement with the arms 26, the outer end portion of the sleeve 31 which carries a rounded or cam bead or flange 46 has contact with the roller 42 and thereby results in the desired rocking movement of the arms 39 for clamping engagement of the jaws 40 with the jumper wire 41 or the like. The arms 39 clamp the wire 41 against the jaw 36 or more particularly the upstanding shank thereof.

After this engagement of the connector C with the body B the jaw 35 is engaged over a line wire W, it being understood of course that the jaw 35 is in sufficient spaced relation with respect to the jaw 36. To facilitate the engagement of the jaw 35 with the line wire W said jaw carries an outwardly disposed guiding tongue 47. The handle member H is then drawn down to bring the head 3 of the rod 2 into proper engagement with the facets 4 so that upon requisite rotation of the handle member H the jaw 35 will be moved toward the jaw 36 and thereby effectively clamp the wires W and 43 between the jaws 35 and 36, thus effecting the desired electrical connection between the wires.

The manner of freeing the connector C from the wires W and 43 is believed to be obvious as it constitutes merely a reversal of the operations necessary to effect the desired application.

Figures 1, 2, 3, 4:
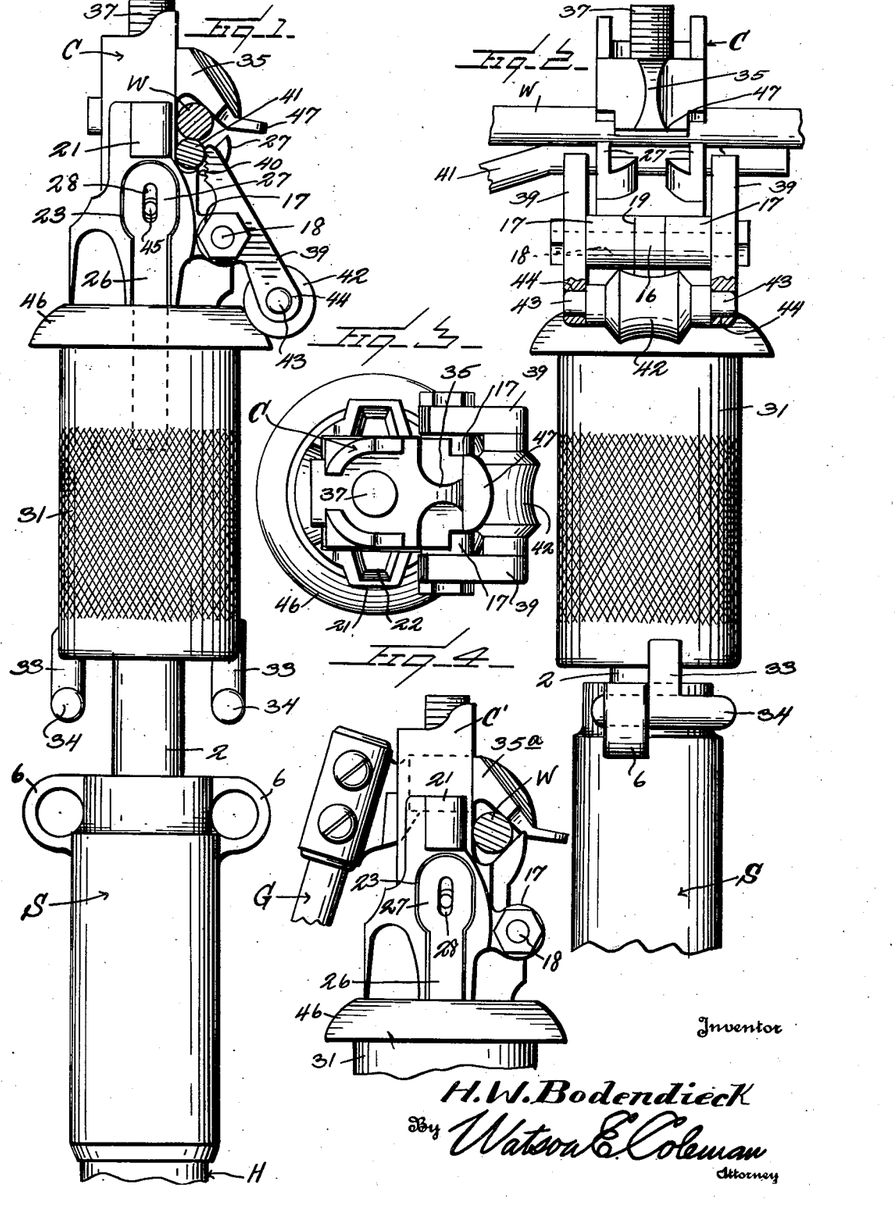
Figure 1 is a view in side elevation of an operating member or stick for hot line equipment constructed in accordance with an embodiment of my invention, its coacting wires being shown in section and the operating handle being illustrated in fragment.
Figure 2 is a view similar to Figure 1 with portions broken away and substantially at right angles to Figure 1, the operating handle being shown in a position to operate the means for holding a wire to a clamp or connector held by the member or stick.
Figure 3 is a view in top plan of the device as illustrated in Figure 1.
Figure 4 is a fragmentary side elevational view illustrating the device as herein disclosed with the clamping means omitted and the device engaged with a connector or clamp of a type different from that illustrated in Figures 1 and 2.
Figures 5, 6, 7, 8:
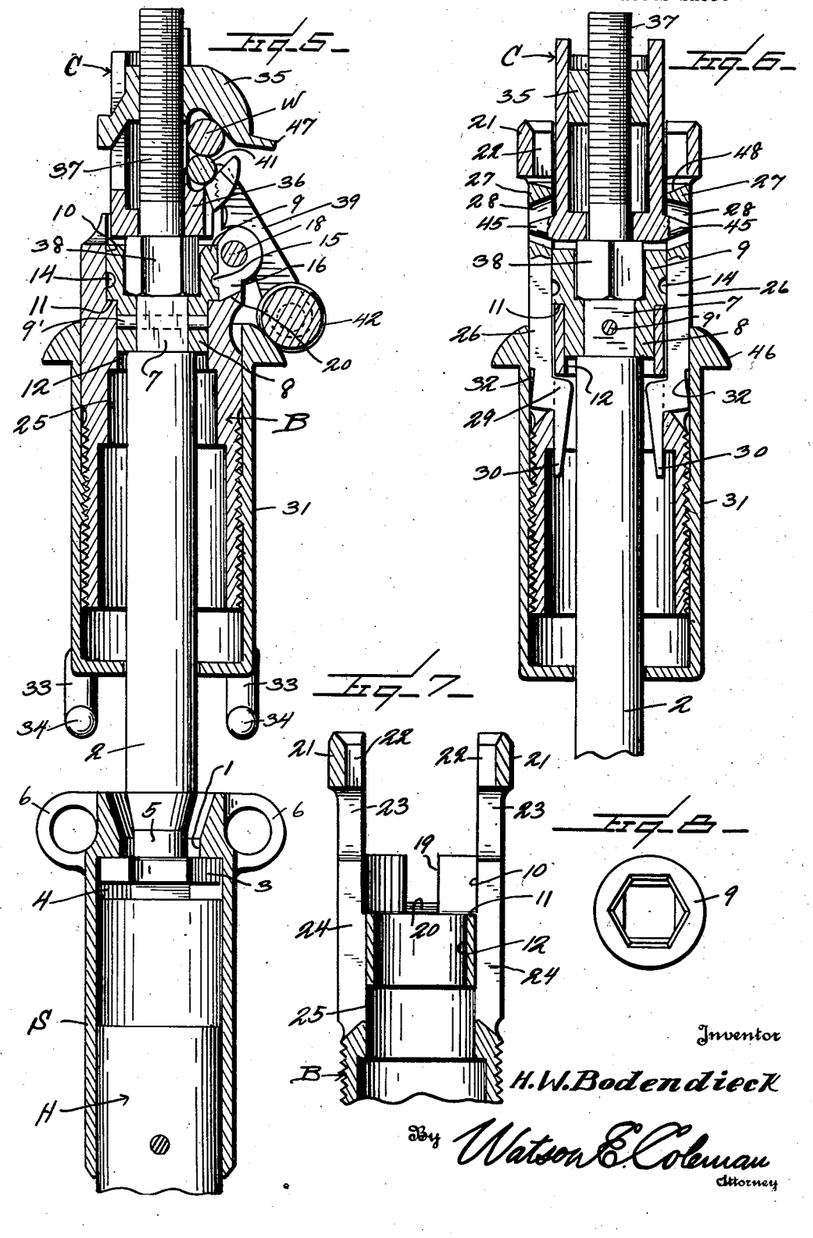
Figure 5 is a vertical sectional view taken through Figure 1 with certain of the parts in elevation.
Figure 6 is a vertical sectional view taken through Figure 1 with certain of the parts in elevation, the line of section being substantially at right angles to the line of section of Figure 5.
Figure 7 is a sectional view taken lengthwise through the main body or sleeve unapplied.
Figure 8 is a view in top plan of the shank engaging socket as herein embodied.

In the embodiment of my invention as illustrated in Figure 4, the construction of the member or hot stick is the same as hereinbefore set forth except that the use of the clamping arms 39 and their associated parts are dispensed with due to the fact that the jaw 35ª of the connector C' has positively connected or coupled thereto a ground wire G or other wire.

To facilitate the initial placement of a connector C or C' between the heads 27 of the arms 26, the outer ends of the heads are provided with inwardly and downwardly inclined guide grooves 48 with which the lugs or fingers 45 are adapted to engage and thus assure desired separating movement of the heads 27.

Figures 9, 10, 11:
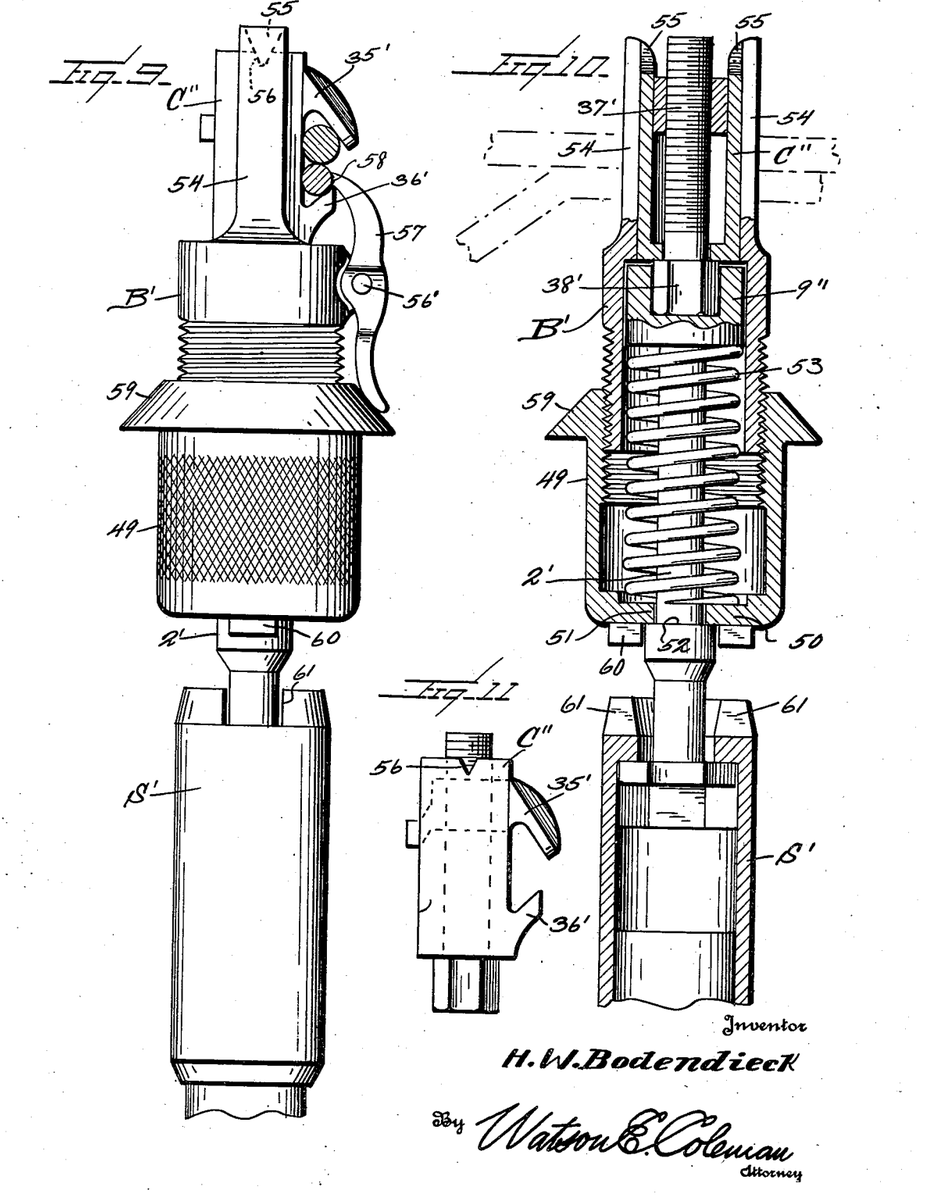
Figure 9 is an elevational view illustrating a member or stick constructed in accordance with another embodiment of my invention, the associated wires being shown in fragment.
Figure 10 is a longitudinal sectional view taken through the structure illustrated in Figure 9 with certain of the parts in elevation.
Figure 11 is an elevational view of the wire connector with which the device or stick as illustrated in Figures 9 and 10 is engaged.

In Figures 9, 10 and 11, I illustrate an embodiment of the invention wherein the rod 2' is operatively connected with the socket member S' in substantially the same manner as hereinbefore set forth with respect to the rod 2. The outer portion of the rod 2' also carries a socket member 9" to receive the head 38' of the threaded shank 37' comprised in the structure of the connector C". This connector C" also comprises the relatively movable jaws 35' and 36', one of which being loosely mounted on the shank 37' and the other threading thereon so that upon requisite rotation of the rod 2' said jaws 35' and 36' will be moved one toward the other or separated. The socket member 9" is snugly arranged within the bore of the tubular body member B'. The inner portion of the body member B' threads within a sleeve 49, the inner or lower end of which being closed by a plate or head 50 as illustrated in Figure 10. This plate or head 50 has a central opening 51 through which the rod 2' is freely directed, said rod 2' outwardly of the plate or head 50 being provided with an enlargement or head 52 for contact with said plate or head 50 to limit the movement of the rod 2' and the socket member 9" in a direction outwardly with respect to the body member B'.

Encircling the rod 2' between the plate or head 50 of the sleeve 49 and the socket member 9" is a coil spring 53 which, upon sufficient movement of the sleeve 49 inwardly of the body member B', places said spring 53 under tension and in contact with the socket member 9" so that the socket member 9" is maintained at the limit of its outward movement or in a position to effectively receive and engage the head 38' of the shank 37' whereby upon rotation of the rod 2' the shank 37' may be rotated in a manner to either move the jaws 35' and 36' one toward the other or to separate such jaws.

The outer end of the body member B' is provided with a pair of outwardly directed elongated arms 54 in opposed relation and terminating in inwardly disposed lugs 55. Each of these lugs 55 is adapted to be received within a notch 56 provided in the upper portion of the shank of the jaw 36' of the connector C" and maintained in such engagement by the pressure of the socket member 9" upon the head 38' of the shank 37'.

When it is desired to apply or to remove the connector C" the sleeve 49 is rotated in a direction to move the same outwardly of the body member B' a distance sufficient to relieve the spring 53 against tension and to allow said spring to move in a direction away from the socket member 9" so that said socket member 9" may drop down to a position below the head 38' of the shank 37'.

The outer portion of the body member B' has pivotally connected thereto, as at 56', the central portion of a lever 57. The outer end portion of this lever 57 constitutes a jaw 58 for contact with a jumper wire or the like to initially clamp the same to the shank of the jaw 36', and the requisite engagement of this jaw 58 with the wire is accomplished by the beveled bead or cam 59 carried by the sleeve 49 for contact with the inner end portion of the lever 57. The operation of this sleeve 49 with respect to the lever 57 is substantially the same as hereinbefore set forth with respect to the sleeve 31 and the arms 39.

In applying the connector C" it is also under certain conditions possible to directly engage the head 38' within the socket member 9" to force said socket member together with the rod 2' downwardly or inwardly a distance sufficient to permit the proper placement of the connector C" with respect to the lugs 55. In this operation the spring 53 of course will be put under sufficient tension to assure the desired holding of the connector.

In the embodiment of the invention as illustrated in Figures 9, 10 and 11, the plate or head 50 of the sleeve 49 is provided with the outwardly disposed or depending lugs 60 each of which being adapted to interlock with a recess 61 in the outer portion of the socket member S' when it is desired to rotate the sleeve 49 to move the same in a desired direction lengthwise of the body member B'.

Figures 12, 13, 14, 15:
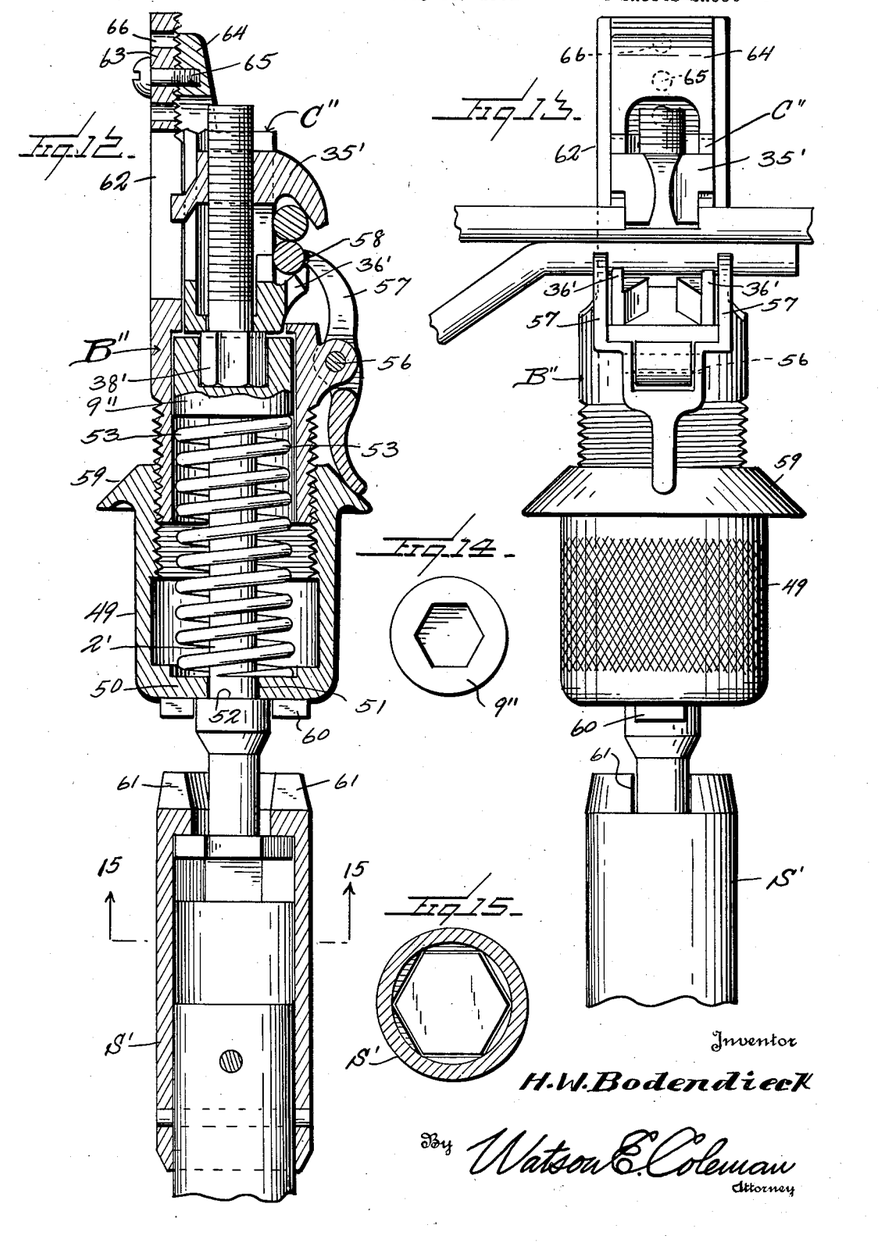
Figure 12 is a sectional view with parts in elevation illustrating a member or stick constructed in accordance with a still further embodiment of my invention.
Figure 13 is an elevational view of the structure as shown in Figure 12.
Figure 14 is a view in top plan of the shank engaging socket as comprised in the invention as illustrated in Figures 9, 10, 12 and 13.
Figure 15 is a sectional view taken substantially on the line 15—15 of Figure 12 looking in the direction of the arrow.

The embodiment of my invention as illustrated in Figures 12 and 13 is substantially the same as that disclosed in Figures 9 and 10 except that the outer portion of the tubular body member B" is provided with an outstanding elongated member 62 having its outer extremity provided with a cross member 63. The inner face of this member 63 is corrugated to provide for adjustable engagement therewith of a holding lug 64. This lug 64 is held in its different adjusted positions to the cross member 63 by a headed screw 65 selectively disposed through the spaced openings 66 in the cross member 63 and in threaded engagement with the lug 64. The applied lug 64 is adapted to contact from above with the outer end portion of the applied connector C". It is believed to be obvious that by use of the adjustable lug 64 the device can be employed with clamps of varying sizes.

From the foregoing description it is thought to be obvious that an operating member or stick for hot line equipment constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A handling device for a wire clamp or connector comprising relatively movable jaws and a rotating shank for effecting such relative movement, said device comprising a tubular member, manually operable means carried by said tubular member for holding the connector or clamp in engagement therewith, a socket member rotatably mounted within the tubular member for engagement with the rotating shank of the connector or clamp, means for rotating the socket member, and means carried by the device for temporarily holding a lead off wire to the clamp or connector while applying the clamp or connector to or removing the same from a line.

2. A handling device for a wire clamp or connector comprising relatively movable jaws and a rotating shank for effecting such relative movement, said device comprising a tubular member, a socket member rotatably supported within the tubular member, said socket member being adapted to engage the rotating shank of the connector or clamp applied to the device, manually operable means for holding the connector or clamp against displacement when the socket member is engaged with the shank, means for rotating the socket member, and means carried by the device for temporarily holding a lead off wire to the clamp or connector while applying the clamp or connector to or removing the same from a line.

3. A handling device for a wire clamp or connector comprising relatively movable jaws and a rotating shank for effecting such relative movement, said device comprising a tubular member, a socket member rotatably supported within the tubular member, said socket member being adapted to engage the rotating shank of the connector or clamp applied to the device, manually operable means for holding the connector or clamp against displacement when the socket member is engaged with the shank, an elongated handle member operatively engaged with the socket member for rotating the same, and means carried by the device for temporarily holding a lead off wire to the clamp or connector while applying the clamp or connector to or removing the same from a line.

4. A handling device for a wire clamp or connector comprising relatively movable jaws and a rotating shank for effecting such relative movement, said device comprising a tubular member, a socket member rotatably supported within the tubular member, said socket member being adapted to engage the rotating shank of the connector or clamp applied to the device, means for holding the connector or clamp against displacement when the socket member is engaged with the shank, an elongated member extending from the socket member, a handle member, a second socket member carried by the handle member, the member extending from the first socket member being disposed within the second socket member, said elongated member and second socket member having coacting means to cause the same to rotate in unison when the said second socket member is in one position, said second socket member and the tubular member having coacting means for locking the same against independent rotation when the second socket member is in a second position.

5. A handling device for a wire clamp or connector comprising relatively movable jaws and a rotating shank for effecting such relative movement, said device comprising a tubular member, a socket member rotatably supported within the tubular member, said socket member being adapted to engage the rotating shank of the connector or clamp applied to the device, means for holding the connector or clamp against displacement when the socket member is engaged with the shank, an elongated member extending from the socket member, a handle member, a second socket member carried by the handle member, the member extending from the first socket member being disposed within the second socket member, said elongated member and second socket member having coacting means to cause the same to rotate in unison when the said second socket member is in one position, said second socket member and the tubular member having coacting means for locking the same against independent rotation when the second socket member is in a second position, said second socket member and handle member being shiftable independently of the tubular member in a direction lengthwise of the handle member.

6. A handling device for a wire clamp or connector comprising relatively movable jaws and a rotating shank for effecting such relative movement, said device comprising a tubular member, a socket member rotatably supported within the tubular member, said socket member being adapted to engage the rotating shank of the connector or clamp applied to the device, means for holding the connector or clamp against displacement when the socket member is engaged with the shank, means for rotating the socket member, and means carried by the tubular member for holding a wire to the connector or clamp engaged with the device.

7. A handling device for a wire clamp or connector comprising relatively movable jaws and a rotating shank for effecting such relative movement, said device comprising a tubular member, a socket member rotatably supported within the tubular member, said socket member being adapted to engage the rotating shank of the connector or clamp applied to the device, means for holding the connector or clamp against displacement when the socket member is engaged with the shank, means for rotating the socket member, a pivoted clamping arm carried by the tubular member for holding wire to the connector or clamp engaged with the device, and means operating independently of the socket member for forcing the clamping arm into working position.

8. A handling device for a wire clamp or connector comprising relatively movable jaws and a rotating shank for effecting such relative movement, said device comprising a tubular member, a socket member rotatably supported within the tubular member, said socket member being adapted to engage the rotating shank of the connector or clamp applied to the device, means for holding the connector or clamp against displacement when the socket member is engaged with the shank, means for rotating the socket member, a pivoted clamping arm carried by the tubular member for holding a wire to the connector or clamp engaged with the device, a sleeve engaged with the tubular member for movement lengthwise thereof, the movement of the sleeve in one direction forcing the clamping arm into working position.

9. A handling device for a wire clamp or connector comprising relatively movable jaws and a rotating shank for effecting such relative movement, said device comprising a tubular member, a socket member rotatably supported within the tubular member, said socket member being adapted to engage the rotating shank of the connector or clamp applied to the device, manually operable means for holding the connector or clamp against displacement when the socket member is engaged with the shank, means for rotating the socket member, said socket member being in swivel connection with the tubular member, and means carried by the device for temporarily holding a lead off wire to the clamp or connector while applying the clamp or connector to or removing the same from a line.

10. A device of the class described comprising a body member, a socket member rotatably carried thereby and adapted for engagement with the operating shank of a wire connector or clamp, manually operable means carried by said body member to engage the wire connector or clamp to hold the same in applied position with respect to the socket member, means for rotating the socket member, and means carried by the device for temporarily holding a lead off wire to the clamp or connector while applying the clamp or connector to or removing the same from a line.

11. A device of the class described comprising a tubular member, a socket member rotatably supported therein, said socket member being adapted to engage the operating member of a wire connector or clamp, swinging arms carried by the tubular member, said arms being adapted to engage outstanding lugs carried by the connector or clamp to hold the connecter or clamp against displacement with respect to the tubular member, and means carried by the tubular member for holding said arms against displacement when engaged with the clamp.

12. A device of the class described comprising a tubular member, a socket member rotatably supported therein, said socket member being adapted to engage the operating member of a wire connector or clamp, swinging arms carried by the tubular member, said arms being adapted to engage the connector or clamp to hold the same against displacement with respect to the tubular member, means carried by the tubular member for holding said arms against displacement when engaged with the clamp, and means carried by the tubular member for holding a wire to the connector or clamp, said wire holding means being under control of the means for holding the arms in engagement with the connector or clamp.

13. An implement for handling a wire connector or clamp having relative movable jaws and an operating member to move one of said jaws toward the other, means carried by said implement to hold the clamp or connector thereto and while the clamp or connector is being applied to a line wire, means carried by the implement engageable with the operating member of the clamp or connector for bringing the jaws of the clamp or connector into desired engagement with the line wire, and means carried by the implement for clamping a jumper wire or the like to the connector or clamp between the jaws thereof.

14. A device of the class described comprising a tubular member, an element rotatably supported within the tubular member to engage the operating member of a wire clamp or connector, swinging arms carried by the tubular member, a sleeve carried by and movable lengthwise of the tubular member, said sleeve when moved in one direction contacting with the arms to move the same in a direction for holding coaction with the wire clamp or connector when engaged with the operating element to hold the clamp or connector against displacement with respect to the tubular member.

15. A device of the class described comprising a tubular member, an element rotatably supported within the tubular member to engage the operating member of a wire clamp or connector, swinging arms carried by the tubular member, a sleeve carried by and movable lengthwise of the tubular member, said sleeve when moved in one direction contacting with the arms to move the same in a direction for holding coaction with the wire clamp or connector when engaged with the operating element to hold the clamp or connector against displacement with respect to the tubular member, the outer end portions of the arms being provided with openings, the clamp or connector having outstanding lugs received within said openings when the arms are moved into holding position with respect to the clamp or cornector.

16. A device of the class described comprising a tubular member, an element rotatably supported within the tubular member to engage the operating member of a wire clamp or connector, swinging arms carried by the tubular member, a sleeve carried by and movable lengthwise of the tubular member, said sleeve when moved in one direction contacting with the arms to move the same in a direction for holding coaction with the wire clamp or connector when engaged with the operating element to hold the clamp or connector against displacement with respect to the tubular member, said arms upon predetermined movement of the sleeve in the opposite direction along the tubular member swinging outwardly by gravity.

17. An implement for handling a wire connector or clamp having relative movable jaws and an operating member to move one of said jaws toward the other, means carried by said implement to hold the clamp or connector thereto and while the clamp or connector is being applied to a line wire, means carried by the implement engageable with the operating member of the clamp or connector for bringing the jaws of the clamp or connector into desired engagement with the line wire, and releasable means carried by the implement for clamping a jumper wire or the like to the connector or clamp between the jaws thereof.

18. An implement for handling a wire connector or clamp having relative movable jaws and an operating member to move one of said jaws toward the other, means carried by said implement to hold the clamp or connector thereto and while the clamp or connector is being applied to a line wire, means carried by the implement engageable with the operating member of the clamp or connector for bringing the jaws of the clamp or connector into desired engagement with the line wire, means carried by the implement for clamping a jumper wire or the like to the connector or clamp between the jaws thereof, and means for bringing said clamping means into action, said clamping means being inactive when said last named means is inactive.

19. A handling device for a wire clamp or connector having relatively movable jaws and a rotating shank for effecting such relative movement, said device comprising a tubular member, a socket member rotatably supported within said tubular member and being adapted to engage the rotating shank of the connector or clamp applied to the device, said socket member being freely rotatable and including a stem, a spring when under tension urging the socket member into engagement with the rotating shank of the wire clamp or connector, and means for placing said spring under such tension and also for releasing said tension to permit the socket member to be disengaged from the shank.

20. A handling device for a wire clamp or connector including relatively movable jaws and a rotating shank for effecting such relative movement, said device comprising a tubular member, a sleeve engaged therewith for movement lengthwise thereof, an element within the tubular member for engagement with the shank to rotate the same, a spring coacting with said element and the sleeve, said spring when under tension urging the element into operative engagement with the shank, and a member operating to either move the sleeve in a direction to place the spring under tension or to release the spring of tension or to operate the element for rotating the shank.

21. An implement for handling a wire connector or clamp having relative movable jaws and an operating member to move one of said jaws toward the other, means carried by said implement to hold the clamp or connector thereto and while the clamp or connector is being applied to a line wire, means carried by the implement engageable with the operating member of the clamp or connector for bringing the jaws of the clamp or connector into desired engagement with the line wire, means carried by the implement for clamping a jumper wire or the like to the connector or clamp between the jaws thereof, and means for bringing said clamping means into action.

22. A device of the character described having, in combination, an operating head comprising a support, stationary and movable holding members on said support for holding a connecter, means for operating the movable holding member, a pole on which said head is movably mounted, means on said pole effective when the head is in one position to operate said holding means, and means on said pole effective when the head is in another position to actuate the clamping screw of the connector.

23. A device of the character described comprising, in combination, an operating pole, a head adjustably mounted on the upper end of said pole and rotatable relatively thereto, said head comprising a supporting member, a first connecter holding member secured to said supporting member, a second connecter holding member movably mounted on said supporting member, means for actuating said movable holding member comprising a screw and nut device, one element of which is mounted on said supporting member, and the other connected to said movable holding member and rotatable relatively thereto, means on the upper end of said pole arranged to interengage with means on said rotatable part for operating said movable holding member, and means on said pole operable to actuate the screw device on the connecter for attaching or releasing the connecter from a line wire.

24. A device of the character described comprising, in combination, an operating pole, a head adjustably mounted on the upper end of said pole and rotatable relatively thereto, said head comprising a supporting member, a first connecter holding member secured to said supporting member, a second connecter holding member movably mounted on said supporting member, means for actuating said movable holding member comprising a screw and nut device, one element of which is mounted on said supporting member, and the other connected to said movable holding member and rotatable relatively thereto, means on the upper end of said pole arranged to interengage with means on said rotatable part for operating said movable holding member, and means operable to actuate the screw device on the connecter.

25. A device of the character described comprising, in combination, an insulating pole, a head movably mounted on the end of said pole and having upper and lower operative positions thereon, holding means for a connecter comprising a part movably mounted on said head, means operable by rotation of said pole when the head is in one of its positions to operate the movable member of said holding means, and means operable by rotation of said pole when said head is in its other operative position to operate the screw device on the connecter.

26. A device of the character described comprising, in combination, a pole embodying an insulating part and a cylindrical part attached to the upper end thereof, a head slidably mounted on said cylindrical part and having upper and lower operative positions thereon, said head comprising holding means for a connecter, means arranged to be operated by said cylindrical part when the head is in one position for operating said holding means, and means on said cylindrical part operable when the head is in its other position for operating the clamping screw on the connecter.

27. A device of the character described comprising, in combination, an insulating pole, a head movably mounted on the end of said pole, holding means for a connecter comprising relatively movable parts mounted on said head, means operable by rotation of said pole to operate the holding means to secure a connecter thereto, and means carried on said pole operable to actuate the screw device on the connecter.

28. A device for installing on a live wire a connecter having a tap wire secured thereto comprising an insulating pole, means on the end of said pole for releasably holding said connecter, means operable by said pole when the live wire has been inserted in the connecter to secure the connecter on said wire, and means operable by said pole after the connecter has been installed to release the connecter from said holding means and permit removal thereof.

29. A device of the character described comprising, in combination, an insulated pole, a head movably mounted on one end of said pole and comprising a support, a stationary holding member and a relatively movable holding member, said holding members being arranged to engage the two parts of a connecter and secure them temporarily together with a tap wire therebetween and a line-wire-receiving recess open, means carried by said pole operable to actuate the clamping screw of the connecter while the parts are so held, and means operable by said pole for releasing said holding member.

30. A handling device for a wire clamp or connector comprising relatively movable jaws and a rotating shank for effecting such relative movement, said device comprising a tubular member, a socket member rotatably supported within the tubular member, said socket member being adapted to engage the rotating shank of the connector or clamp applied to the device, means for holding the connector or clamp against displacement when the socket member is engaged with the shank, means for rotating the socket member, means carried by the tubular member pivoting to hold a wire in operative relation to the connector or clamp engaged with the device, and means operating independently of the socket member for forcing the clamping arm into working position.

31. A handling device for a wire clamp or connector comprising relatively movable jaws and a rotating shank for effecting such relative movement, said device comprising a tubular member, a socket member rotatably supported within the tubular member, said socket member being adapted to engage the rotating shank of the connector or clamp applied to the device, means for holding the connector or clamp against displacement when the socket member is engaged with the shank, means for rotating the socket member, means carried by the tubular member pivoting to hold a wire in operative relation to the connector or clamp engaged with the device, a sleeve engaged with the tubular member for movement lengthwise thereof, the movement of the sleeve in one direction forcing the clamping arm into working position.

32. In a structure of the character set forth in claim 14, a wire clamp or connector having means interlocking with the swinging arms to increase the holding action of the arms.

33. In a structure of the character set forth in claim 14, a wire clamp or connector having outstanding lugs interlocking with the swinging arms to increase the holding action of the arms.

HENRY W. BODENDIECK.